(12) United States Patent
Shelton

(10) Patent No.: US 12,152,950 B2
(45) Date of Patent: Nov. 26, 2024

(54) TENSION GAUGE DEVICE FOR MEASURING AND MONITORING TENSION FORCES ON A HOLDING MECHANISM

(71) Applicant: Alton Shelton, Cypress, TX (US)

(72) Inventor: Alton Shelton, Cypress, TX (US)

(*) Notice: Subject to any disclaimer, the term of this patent is extended or adjusted under 35 U.S.C. 154(b) by 0 days.

(21) Appl. No.: 17/963,977

(22) Filed: Oct. 11, 2022

(65) Prior Publication Data

US 2023/0112045 A1    Apr. 13, 2023

Related U.S. Application Data

(60) Provisional application No. 63/253,637, filed on Oct. 8, 2021.

(51) Int. Cl.
| | |
|---|---|
| *G01L 5/00* | (2006.01) |
| *G01B 11/16* | (2006.01) |
| *G01L 1/24* | (2006.01) |
| *G01L 5/04* | (2006.01) |
| *G01L 5/24* | (2006.01) |

(52) U.S. Cl.
CPC ............ *G01L 5/0033* (2013.01); *G01L 1/242* (2013.01); *G01L 5/047* (2013.01); *G01B 11/16* (2013.01); *G01B 11/18* (2013.01); *G01L 5/24* (2013.01)

(58) Field of Classification Search
CPC ......... G01B 11/16; G01B 11/18; G01L 5/047; G01L 5/24; G01L 1/242; G01M 11/088
USPC .......................................................... 73/826
See application file for complete search history.

(56) References Cited

U.S. PATENT DOCUMENTS

| 4,408,925 A | * | 10/1983 | Louie | ..................... F16G 11/12 |
| | | | | 411/10 |
| 4,596,297 A | * | 6/1986 | Skibinski | ............. G01G 3/1414 |
| | | | | 177/244 |
| 5,026,230 A | * | 6/1991 | Dolezych | .................. G01L 5/06 |
| | | | | 267/71 |
| 2005/0278902 A1 | * | 12/2005 | Wilcox | ................. B60P 7/0861 |
| | | | | 24/68 CD |

(Continued)

FOREIGN PATENT DOCUMENTS

| CN | 110180937 A | * | 8/2019 |
| CN | 110645229 A | * | 1/2020 |

(Continued)

OTHER PUBLICATIONS

Translation CN-112747808 (Year: 2021).*
Translation CN-110180937 (Year: 2019).*

*Primary Examiner* — Peter J Macchiarolo
*Assistant Examiner* — Monica S Young
(74) *Attorney, Agent, or Firm* — BOTKIN & HALL, LLP; Michael D. Marston, Esq.

(57) ABSTRACT

A tension measuring device for a holding mechanism such as a ratchet or tie down strap. In one embodiment, a tension measuring device comprises a two-part frame, comprising a movable frame part and a stationary frame part. The movable frame part comprises a first connection portion, one or more biasing element rods, a biasing element lock plate with indicator needle, and one or more rod bolt caps. The stationary frame part comprises a second connection portion, a biasing element chamber, and one or more biasing element rod apertures. Further, the tension measuring device comprises one or more biasing elements and a housing.

19 Claims, 5 Drawing Sheets

(56) References Cited

U.S. PATENT DOCUMENTS

| | | | | |
|---|---|---|---|---|
| 2008/0193248 A1* | 8/2008 | Lindblad | ............... | B60P 7/0823 |
| | | | | 410/100 |
| 2009/0250543 A1* | 10/2009 | Bond | ...................... | B66D 1/04 |
| | | | | 29/469 |
| 2010/0077867 A1* | 4/2010 | Ihrke | ..................... | G01L 1/2243 |
| | | | | 73/862.041 |
| 2011/0000317 A1* | 1/2011 | Ruan | ...................... | B60P 7/083 |
| | | | | 73/862.42 |
| 2012/0267591 A1* | 10/2012 | Bond | ..................... | B25B 25/00 |
| | | | | 254/222 |
| 2014/0070152 A1* | 3/2014 | Bond | ..................... | B25B 25/00 |
| | | | | 254/222 |
| 2016/0061676 A1* | 3/2016 | Brown | ................. | G01L 5/0033 |
| | | | | 73/862.68 |

FOREIGN PATENT DOCUMENTS

| | | | | |
|---|---|---|---|---|
| CN | 112747808 | A | * | 5/2021 |
| CN | 216112367 | U | * | 3/2022 |
| WO | WO-2019241824 | A1 | * | 12/2019 |

* cited by examiner

TENSION GAUGE DEVICE FOR MEASURING AND MONITORING TENSION FORCES ON A HOLDING MECHANISM

CROSS-REFERENCE TO RELATED APPLICATIONS

This application is a non-provisional application which claims the benefit of U.S. Provisional Application No. 62/253,637 filed on Oct. 8, 2021, the disclosure of which is incorporated by reference herein in its entirety.

STATEMENT REGARDING FEDERALLY SPONSORED RESEARCH OR DEVELOPMENT

Not applicable.

BACKGROUND OF THE INVENTION

Field of the Invention

The present invention relates to a tension gauge device. More particularly, the present invention relates to a tension gauge device that may be outfitted or manufactured onto a strap, chain, and/or rachet and is capable of measuring and/or monitoring the tension forces being applied to said strap, chain and/or ratchet.

BACKGROUND OF THE INVENTION

Straps and/or chains may often be utilized in various holding mechanisms such as, without limitation, ratchet straps, tie down straps or chains, and holding straps or chains. These holding mechanisms may be fasteners used to hold down equipment or cargo on or in a vehicle such as a truck, trailer, shipping container, or the like, during transportation. Further, these holding mechanisms may be fasteners used to hold or carry equipment or cargo in need of transfer or movement. Typically, these straps and/or chains may be outfitted with various mechanisms such as hooks and/or ratchets to facilitate a tight and secure hold of the equipment or cargo. For instance, the ratchets may govern the amount of tension or pulling force applied to straps during operation. However, currently there is no means by which to measure and/or monitor tension force in these straps and/or chains, and this could potentially lead to the inadequate securement of equipment or cargo. For instance, the tension force applied to the straps and/or chains may be too weak about the equipment or cargo and result in movement, shifting, or dropping of the equipment or cargo during transportation. Alternatively, the tension force applied to the straps may be too strong about the equipment or cargo and result in damage to the equipment or cargo, or even the straps, chains and/or ratchets themselves.

Consequently, there is a need for a tension gauge device that may be outfitted or manufactured onto a strap, chain and/or ratchet that is capable of measuring and/or monitoring the tension forces being applied to said strap, chain, and/or ratchet.

BRIEF SUMMARY OF SOME OF THE PREFERRED EMBODIMENTS

These and other needs in the art are addressed in one embodiment by a tension measuring device coupled to a holding mechanism, wherein the tension measuring device comprises a two-part frame, comprising a movable frame part and a stationary frame part. The movable frame part comprises a first connection portion, one or more biasing element rods, a biasing element lock plate with indicator needle, and one or more rod bolt caps. The stationary frame part comprises a second connection portion, a biasing element chamber, and one or more biasing element rod apertures. Further, the tension measuring device comprises one or more biasing elements and a housing.

These and other needs in the art are addressed in one embodiment by a tension measuring device coupled to a holding mechanism, wherein the tension measuring device comprises a load cell coupled to a first connection portion and a second connection portion at opposing ends, wherein the load cell comprises a transmission wire. Further, the tension measuring device comprises a digital display, a battery, and a housing, wherein the transmission wire is connected from the load cell to the digital display, and wherein the battery powers the load cell and the digital display.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
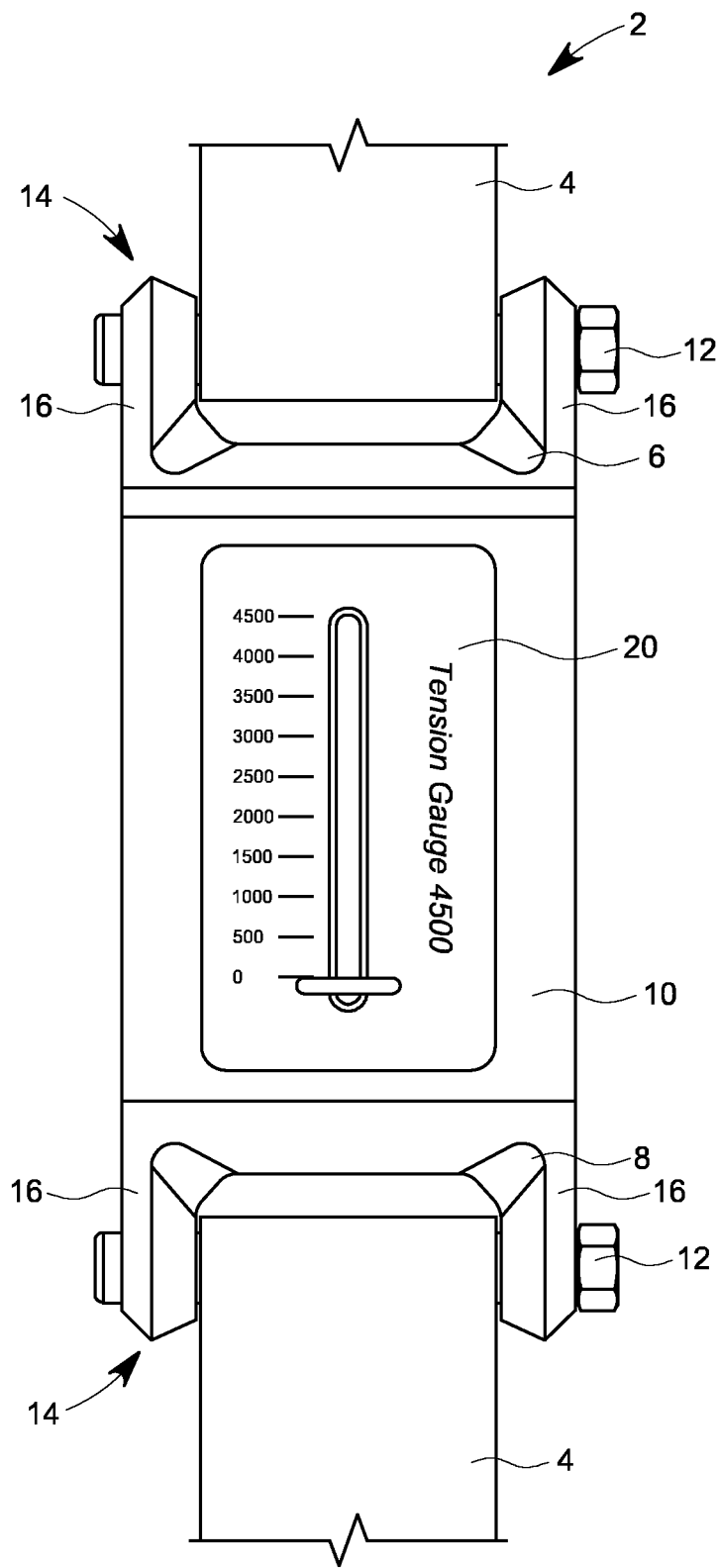
FIG. 1 illustrates a front view of a tension gauge device according to an embodiment of the present invention.

FIG. 1 illustrates a front view of a tension gauge device 2 that may be outfitted or manufactured onto a holding mechanism such as, without limitation, a ratchet, ratchet strap, tie down strap or chain, or holding strap or chain. In embodiments, the holding mechanism may comprise straps 4, which may include, without limitation, nylon straps, polyester straps, metal chains, or the like. In embodiments, tension gauge device 2 may comprise a two-part frame 6 and 8, fasteners 12, and a housing 10. Two-part frame 6 and 8 may comprise a movable frame part 6 and a stationary frame part 8, each frame part comprising a connection portion 14. In embodiments, connection portions 14 may comprise a plurality of extensions 16 through which an aperture 18 (illustrated in FIGS. 2 and 4A-4C), either threaded or unthreaded, may be disposed. Apertures 18 in conjunction with fasteners 12 and straps 4 may provide a means by which to attach tension gauge device 2 to the holding mechanism. In embodiments, fasteners 12 may comprise nuts and bolts such that a fastener bolt may travel through a first aperture 18, a loop formed by strap 4, and a second aperture 18, and be received by a fastener nut at each connection portion 14, thus securely fastening tension gauge device 2 to straps 4. In alternative embodiments, fasteners 12 may be rivets, screws, and/or other suitable fasteners, and one or both connection portions 14 may be attached to hook mechanisms rather than straps 4 (not illustrated). In embodiments, two-part frame 6 and 8 of tension gauge device 2, and more particularly stationary frame part 8 of two-part frame 6 and 8, may be at least partially covered by housing 10. Housing 10 may comprise a front portion and a back portion coupled together by any suitable means. In embodiments, the front portion of housing 10 may comprise an analog display unit 20 for displaying the tension forces being applied to tension gauge device 2, particularly when outfitted onto a ratchet or tie down strap.

Figure 2:
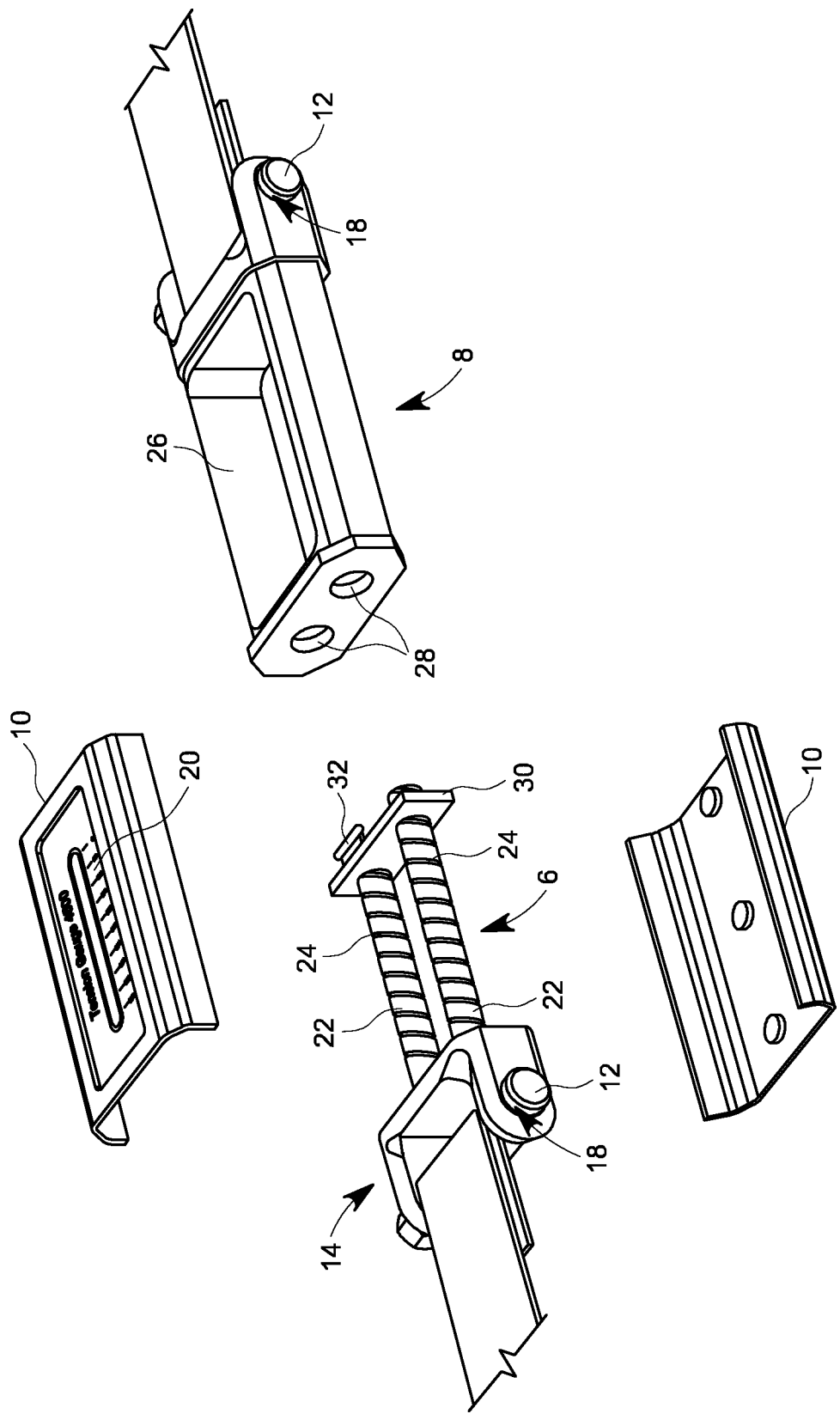
FIG. 2 illustrates an exploded view of a tension gauge device according to an embodiment of the present invention.

FIG. 2 illustrates an exploded view of tension gauge device 2 which, as previously disclosed, comprises two-part frame 6 and 8 (i.e., movable frame part 6 and stationary frame part 8), fasteners 12, and housing 10. As further illustrated in FIG. 2, movable frame part 6 of two-part frame 6 and 8 may comprise one or more biasing element rods 22 extending from connection portion 14. Further, stationary frame part 8 of two-part frame 6 and 8 may comprise a biasing element chamber 26 and one or more biasing element rod apertures 28. In embodiments, one or more biasing element rods 22, biasing element chamber 26, and one or more biasing element rod apertures 28 provide a means by which to mate movable frame part 6 with stationary frame part 8. For example, one or more biasing element rods 22 may pass through one or more biasing element rod apertures 28 and be fully received and/or enclosed by biasing element chamber 26. Within biasing element chamber 26, each of the one or more biasing element rods 22 may comprise a biasing element 24 disposed about its outer surface. In embodiments, one or more biasing elements 24 may be, without limitation, any suitable springs, compression springs, disc washer springs, Belleville washers, or the like. In embodiments comprising disc washer springs or Belleville washers (illustrated in FIG. 4A), such washers may be held in place between an inner surface of stationary frame part 8 and a biasing element lock plate 30. Biasing element lock plate 30 may be a singular panel sized and shaped to fit within biasing element chamber 26, and further fixed to the end or ends of one or more biasing element rods 22 via rod bolt caps 23 (illustrated in FIG. 4A). In embodiment, one or more biasing elements 24 may be configurable so as to provide a desired rating for tension gauge device 2.

Figure 3A:
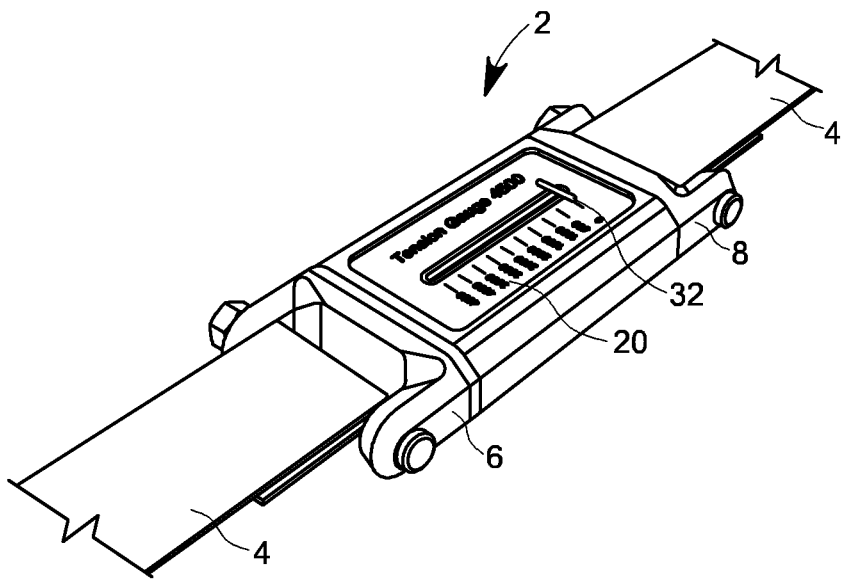
FIG. 3A illustrates a perspective view of a tension gauge device according to an embodiment of the present invention, the device in a resting position.

By nature of the one or more biasing elements 24 acting on two-part frame 6 and 8, tension gauge device 2 may assume a resting position in which no axial displacement of movable frame part 6 occurs. In this resting position, tension forces may not be applied to straps 4 and one or more biasing elements 24 may be allowed to fully decompress, thus resulting in movable frame part 6 being fully mated with stationary frame part 8. This resting position of tension gauge device 2 may be illustrated in both FIGS. 1 and 3A.

Figure 3B:
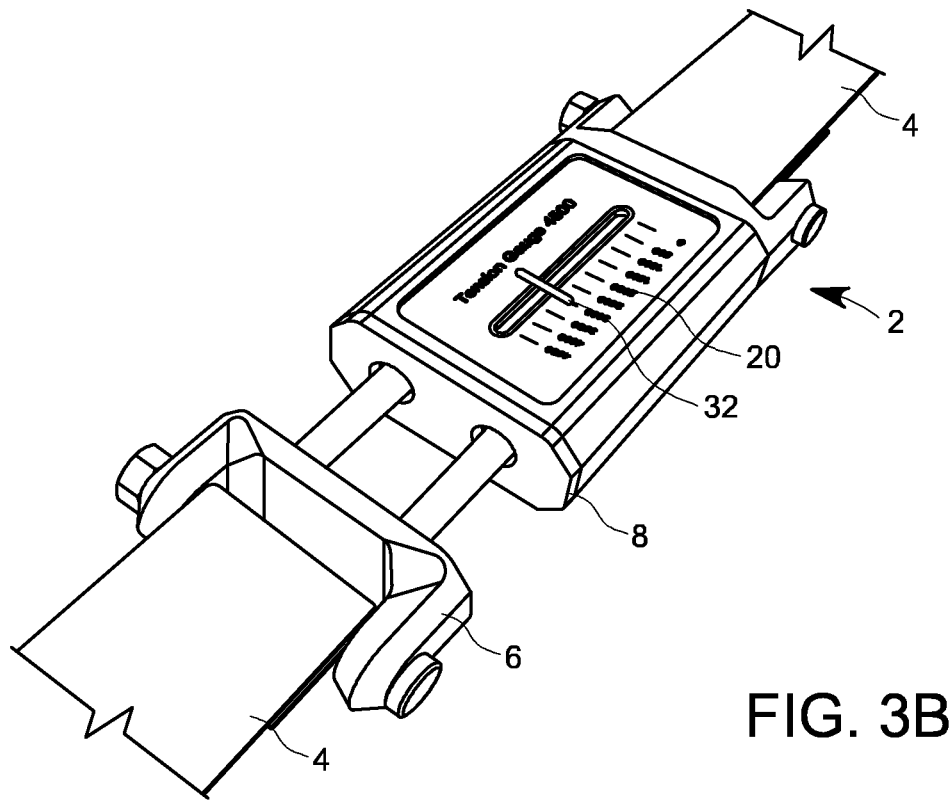
FIG. 3B illustrates a perspective view of a tension gauge device according to an embodiment of the present invention, the device in a tension-applied position.

However during operation, as illustrated in FIG. 3B, movable frame part 6 may be capable of axial displacement relative to stationary frame part 8. In embodiments, axial displacement may occur when applying tension forces to straps 4, either by a ratchet mechanism disposed on the ratchet or tie down strap or by another suitable means. When applying said tension forces to the ratchet or tie down strap (i.e., straps 4), movable frame part 6 may be axially displaced in a direction opposite stationary frame part 8, which may compress one or more biasing elements 24 relative to the amount of tension forces being applied to tension gauge device 2. As such, the applied tension force may be measured and/or monitored by an operator. In an alternative embodiment, one or more biasing element rods 22 may be telescoping rods that collapse when tension forces may be applied to straps 4. In such an embodiment, axial displacement may only occur in the telescoping rods and biasing element lock plate 30 within biasing element chamber 26 such that one or more biasing elements 24 may be compressed relative to the amount of tension forces applied. Therefore, once again, the applied tension force may be measured and/or monitored by an operator. In some embodiments, particularly when tension gauge device 2 utilizes an analog display unit 20, biasing element lock plate 30 may comprise an indicator needle 32 (illustrated in FIG. 2) that moves in relation to the axial displacement of movable frame part 6. In embodiments, indicator needle 32 may be incorporated into the analog display unit 20 to allow an operator to visualize the amount of tension force being applied to the ratchet or tie down strap. In such an embodiment, the analog display unit 20 may further comprise a graphically printed Lexan dial with unit markings to which indicator needle 32 may point to. The unit markings on the graphically printed Lexan dial may be appropriately scaled, whereby indicator needle 32 may point to the unit markings corresponding to the applied tension forces.

Figure 4C:
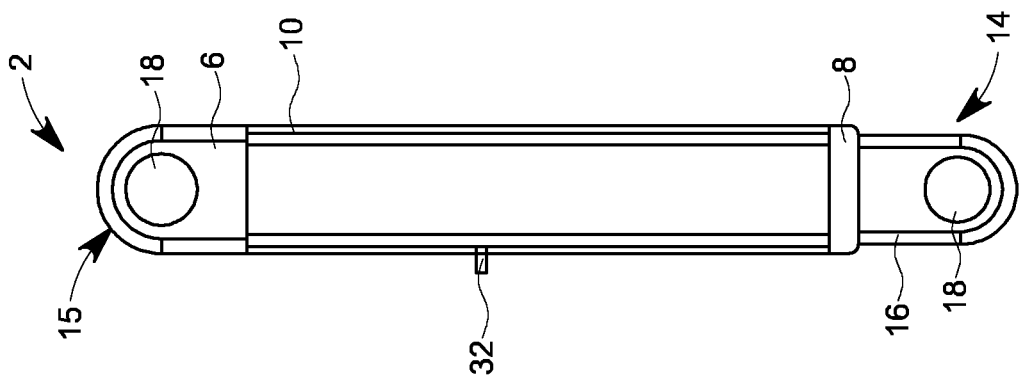
FIGS. 4A-4C illustrate a perspective, front, and side view, respectively, of a tension gauge device according to an alternate embodiment of the present invention.
Figure 4B:
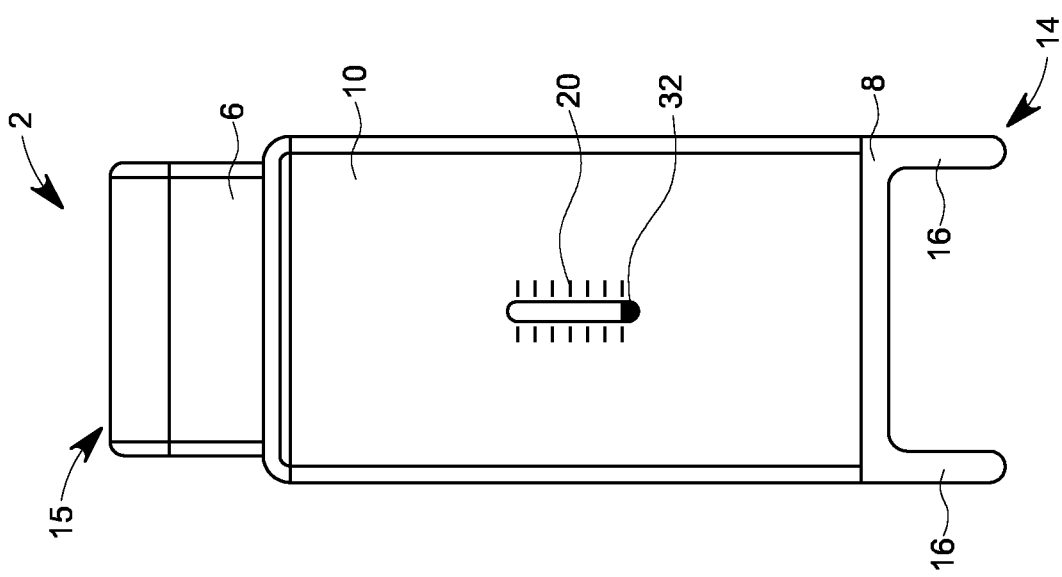
Figure 4A:
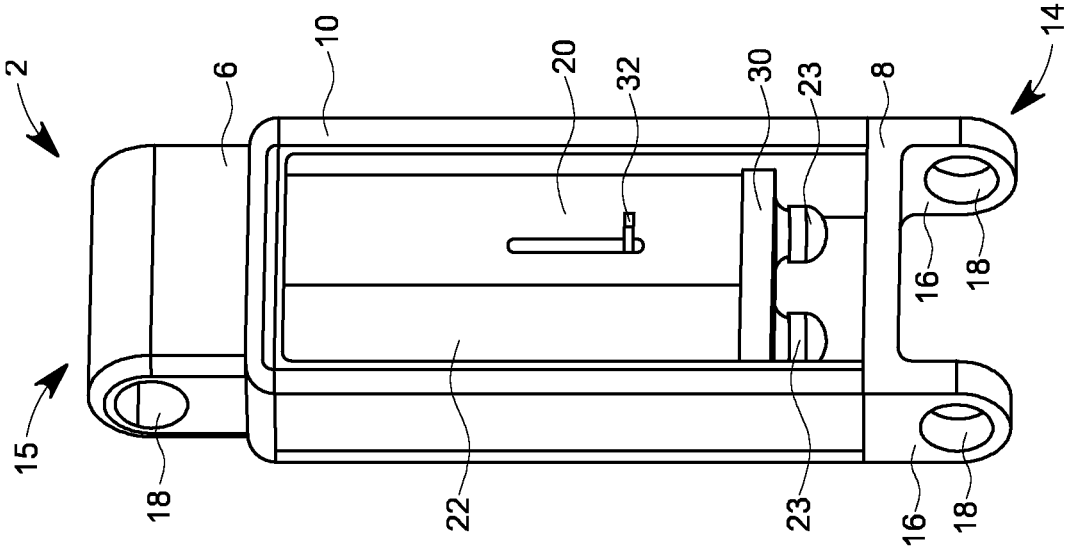

FIGS. 4A-4C illustrate an alternate embodiment of tension gauge device 2 from a perspective, front, and side view respectively. Similarly to the aforementioned embodiment of tension gauge 2, this embodiment of tension gauge device 2 may be outfitted or manufactured onto a holding mechanism such as, without limitation, a ratchet, ratchet strap, tie down strap or chain, or holding strap or chain. In particular, this embodiment of tension gauge 2 may be configured to connect directly to a ratchet of a ratchet strap via a connection portion 15. Similar to the aforementioned embodiment, this embodiment of tension gauge device 2 may comprise a two-part frame 6 and 8 and a housing 10. Two-part frame 6 and 8 may comprise a movable frame part 6 and a stationary frame part 8, wherein the movable frame part 6 comprises connection portion 15 and stationary frame part 8 comprising connection portion 14. In such embodiments, connection portion 14 may comprise a plurality of extensions 16 through which an aperture 18, either threaded or unthreaded, may be disposed, whereas connection portion 15 may comprise a single uniform extension through which a singular aperture 18, threaded or unthreaded, may be disposed. Apertures 18 may provide a means by which to attach this embodiment of tension gauge device 2 to a ratchet mechanism and or strap of a ratchet strap via nuts, bolts, screws, dowels, and/or rivets. In such embodiments, two-part frame 6 and 8 of tension gauge device 2, and more particularly stationary frame part 8 of two-part frame 6 and 8, may be at least partially covered by housing 10. Housing 10 may comprise a front portion and a back portion coupled together by any suitable means. Similarly to the aforementioned embodiment, the front portion of housing 10 may comprise an analog display unit 20 for displaying the tension forces being applied to tension gauge device 2. However, indicator needle 32 in this alternate embodiment may extend from biasing element lock plate 30, between one or more biasing elements 20, and out through a notch in housing 10.

Figure 5C:
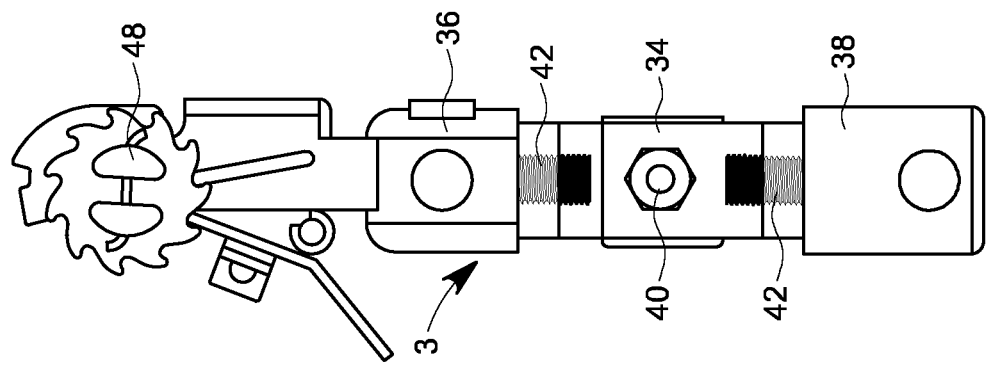
FIGS. 5A-5C illustrate a perspective, front, and side view, respectively, of a digital tension gauge device according to an embodiment of the present invention.
Figure 5B:
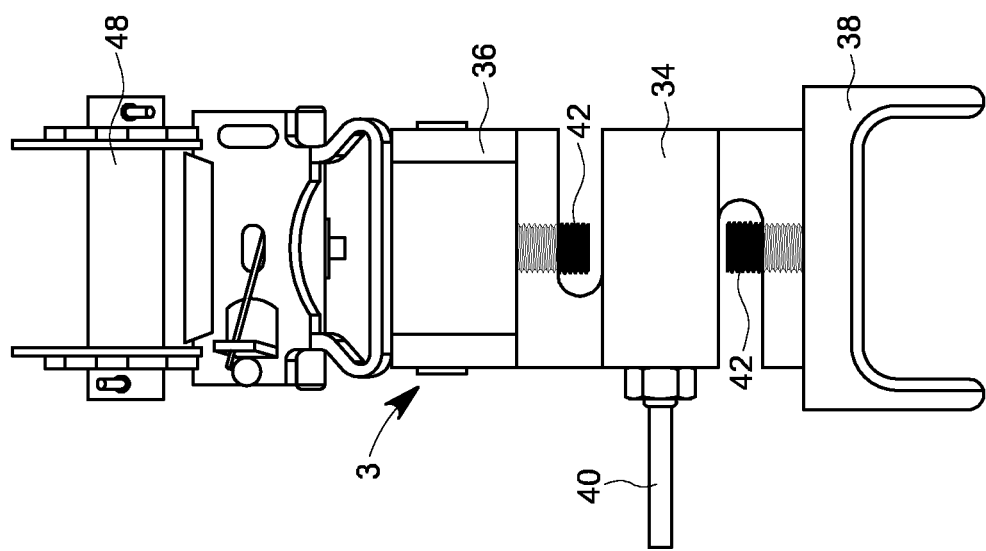
Figure 5A:
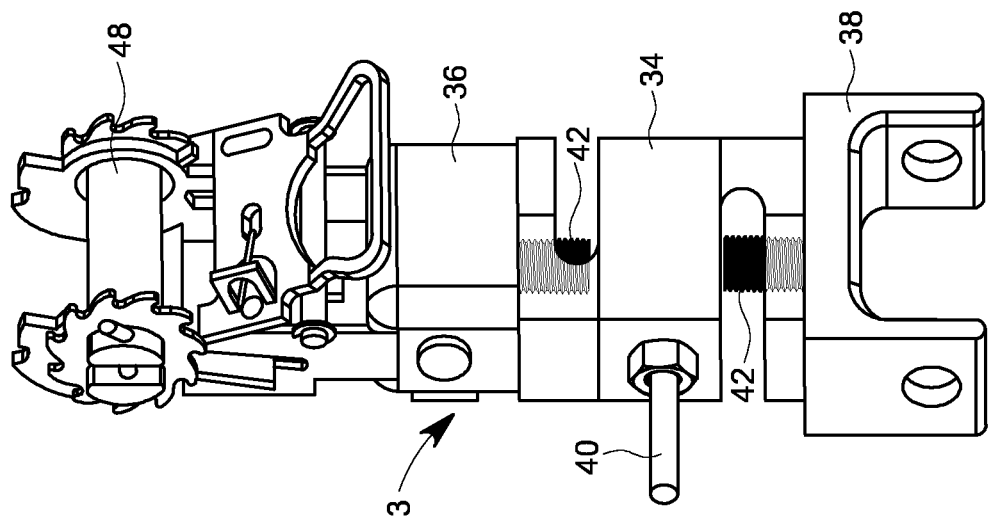

FIGS. 5A-5C illustrate a tension gauge device 3 that may also be connected to a holding mechanism and provide the tension force being applied to that holding mechanism, similarly to tension gauge device 2. However, tension gauge device 3 may obtain and display such tension force differently. In such embodiments, tension gauge device 3 may comprise, a load cell 34, connection portions 36 and 38, and transmission wire 40. Load cell 34 may be any suitable load cell type such as, without limitation, S-type, single column, multiple column, donut, or canister. Further, load cell 34 may be coupled to connection portions 36 and 38 at opposing ends via threaded bolts or screws 42. Similar to connection portion 16 of the alternate embodiment of tension gauge 2, connection portion 38 may comprise a plurality of extensions 44 through which an aperture 46, either threaded or unthreaded, may be disposed, whereas connection portion 36, similar to connection portion 15, may comprise a single uniform extension through which a singular aperture 46, threaded or unthreaded, may be disposed. Apertures 46 may provide a means by which to attach this embodiment of tension gauge device 3 to a ratchet mechanism 48 and/or strap of a ratchet strap via nuts, bolts, screws, dowels, and/or rivets. Although not illustrated, load cell 34, may be partially or fully covered by a housing comprising a front portion and a back portion coupled together by any suitable means.

In operation, load cell 34 may be configured to measure the tension force applied at its ends which may be coupled to connection portions 36 and 38. Such a tension measurement may be transmitted through transmission wire 40 and output to a digital display (not illustrated) to which wire 40 may be connected. The digital display, though not illustrated, may be disposed on an external surface of the housing of tension gauge 3 through any suitable means of adherence. Furthermore, both load cell 34 and the digital display may be power by a battery disposed at any suitable location within or on tension gauge 3.

Although the present invention and its advantages have been described in detail, it should be understood that various changes, substitutions and alterations may be made herein without departing from the spirit and scope of the invention as defined by the appended claims.

What is claimed is:

1. A tension measuring device coupled to a holding mechanism, wherein the tension measuring device comprises:
   a two-part frame comprising;
   a movable frame part comprising;
   a first connection portion, wherein the first connection portion comprises a first set of plurality of extensions;
   one or more first holding mechanism apertures;
   one or more biasing element rods extending from the first connection portion, wherein each of the one or more biasing element rods comprises a biasing element disposed about the outer surface of each of the one or more biasing element rods, and further wherein each of the biasing elements comprises a disc washer spring, wherein each of the disc washer springs is configurable to provide a desired rating for the tension measuring device;
   a biasing element lock plate with an indicator needle and biasing element lock plate apertures, wherein the indicator needle moves in relation to an axial displacement of the movable frame part, and wherein the biasing element lock plate is fixed to the end of each of the one or more biasing element rods via the one or more rod bolt caps; and
   one or more rod bolt caps;
   wherein the movable frame part and said biasing element lock plate are capable of axial displacement relative a stationary frame part, wherein the axial displacement of the movable frame part is in a direction opposite to the stationary frame part,
   the stationary frame part comprising:
   a second connection portion, wherein the second connection portion comprises a second set of plurality of extensions;
   one or more second holding mechanism apertures;
   a biasing element chamber; and
   one or more biasing element rod apertures in a single plate, wherein each of the one or more biasing element rods passes through one of the biasing element rod apertures and is then fully received and enclosed by the biasing element chamber, wherein the biasing element lock plate is a singular panel with the biasing element lock plate apertures aligned with the biasing element rod apertures for biasing element rod movement into the biasing element chamber;
   wherein each of the disc washer springs are held in place between an inner surface of the stationary frame part and the biasing element lock plate, wherein the biasing element lock plate is a singular panel with said biasing element lock plate apertures aligned with said biasing element rod apertures for biasing element rod movement into said biasing element chamber; and
   further wherein the displacement of the movable frame part compresses the one or more biasing elements relative to the amount of tension force being applied to the tension measuring device;
   one or more fasteners; and
   a housing, wherein the housing partially covers the two-part frame, and further wherein the housing comprises an analog display unit, wherein the analog display unit comprises a graphically printed dial with unit markings, wherein the indicator needle is capable of pointing to a specific unit marking.

2. The tension measuring device of claim 1, wherein the one or more biasing element rods slidably mates with the stationary frame part through the one or more biasing element rod apertures and held within the biasing element chamber via the one or more biasing elements, the biasing element lock plate, and the one or more rod bolt caps.

3. The tension measuring device of claim 2, wherein the two-part frame is capable of axial displacement when a tension force is applied to the first and second connection portions.

4. The tension measuring device of claim 3, wherein the tension force is measured relative to the axial movement via the indicator needle and an analog display disposed on a surface of the housing.

5. The tension measuring device of claim 1, wherein the one or more biasing elements are configured to provide any desired tension rating.

6. The tension measuring device of claim 1, wherein the first connection portion is connected to a ratchet or a ratchet strap via the one or more fasteners.

7. The tension measuring device of claim 1, wherein the second connection portion is connected to a ratchet or a ratchet strap via the one or more fasteners.

8. The tension measuring device of claim 1, wherein the housing encloses the biasing element chamber.

9. A tension measuring device comprising:
a movable frame part having a first connection portion having a plurality of extensions and having a rod extending between said extensions, a pair of biasing element rods extending from said first connection portion, said biasing element rods including a biasing element disposed about an outer surface of each of said biasing element rods wherein said biasing element is a disc washer spring;
a stationary frame part having a second connection portion having a plurality of extensions and having a biasing element chamber and rod apertures in a panel of said biasing element chamber for slidably receiving said biasing element rods so that said biasing element rods extend beyond an inner surface of said panel of said biasing element rod chamber that includes said rod apertures wherein said biasing element chamber receives said biasing element rods;
a lock plate fixed to said biasing element rods wherein said lock plate is located within said biasing element chamber and said biasing elements are contained between said lock plate and said inner surface, said lock plate including an indicator, displacement of said movable frame part compresses said biasing elements between said inner surface and said lock plate, said indicator moving an axial displacement of said movable frame part with respect to said stationary frame part, said displacement compressing said biasing elements relative to the amount of tension force being applied to said measuring device; and
said indicator moving relative to printed unit markings on said stationary frame part to indicate said amount of tension force being applied to said measuring device.

10. The tension measuring device of claim 9, wherein said biasing elements are compression springs.

11. The tension measuring device of claim 9, wherein said biasing elements are a plurality of Belleville washers.

12. The tension measuring device of claim 9, wherein the first connection portion is connected to a ratchet or a ratchet strap.

13. The tension measuring device of claim 9, wherein the second connection portion is connected to a ratchet or a ratchet strap.

14. A tension measuring device:
a movable frame part having a first connection portion having a plurality of extensions and having a rod extending between said extensions, a biasing element rod extending from said first connection portion, said biasing element rod including a biasing element disposed about an outer surface of said biasing element rod wherein said biasing element is a disc washer spring;
a stationary frame part having a second connection portion having a plurality of extensions and having a biasing element chamber and a rod aperture in a portion of said biasing element chamber for slidably receiving said biasing element rod so that said biasing element rod extends beyond an inner surface of said portion of said biasing element rod chamber that includes said rod aperture wherein said biasing element rod chamber receives said biasing element rod;
a lock plate fixed to said biasing element rod wherein said lock plate is located within said biasing element chamber and said biasing element is contained between said lock plate and said inner surface, said lock plate including an indicator, displacement of said movable frame part compresses said biasing elements between said inner surface and said lock plate, said indicator moving an axial displacement of said movable frame part with respect to said stationary frame part, said displacement compressing said biasing elements relative to the amount of tension force being applied to said measuring device;
said indicator moving relative to printed unit markings on said stationary frame part to indicate said amount of tension force being applied to said measuring device.

15. A tension measuring device comprising:
a movable frame part having a first connection portion having a plurality of extensions and having a rod extending between said extensions, a biasing element rod extending from said first connection portion, said biasing element rod including a biasing element disposed about an outer surface of said biasing element rod;
a stationary frame part having a second connection portion having a plurality of extensions and having a biasing element chamber and a rod aperture in a portion of said biasing element chamber for slidably receiving said biasing element rod so that said biasing element rod extends beyond an inner surface of said portion of said biasing element rod chamber that includes said rod aperture wherein said biasing element chamber receives said biasing element rod;
a lock plate fixed to said biasing element rod wherein said lock plate is located within said biasing element chamber and said biasing element is contained between said lock plate and said inner surface, said lock plate including an indicator, displacement of said movable frame part compresses said biasing element between said inner surface and said lock plate, said indicator moving an axial displacement of said movable frame part with respect to said stationary frame part, said displacement compressing said biasing element relative to the amount of tension force being applied to said measuring device; and
said indicator moving relative to printed unit markings on said stationary frame part to indicate said amount of tension force being applied to said measuring device.

16. The tension measuring device of claim 15, wherein said biasing elements are compression springs.

17. The tension measuring device of claim 15, wherein said biasing elements are a plurality of Belleville washers.

18. The tension measuring device of claim 15, wherein the first connection portion is connected to a ratchet or a ratchet strap.

19. The tension measuring device of claim 15, wherein the second connection portion is connected to a ratchet or a ratchet strap.

* * * * *